United States Patent [19]
Karwat et al.

[11] Patent Number: 4,474,740
[45] Date of Patent: Oct. 2, 1984

[54] METHOD FOR REGENERATING PHYSICALLY ACTING ORGANIC SCRUBBING AGENTS

[75] Inventors: Heinz Karwat, Pullach; Peter Haussinger, Munich, both of Fed. Rep. of Germany

[73] Assignee: Linde Aktiengesellschaft, Fed. Rep. of Germany

[21] Appl. No.: 434,778

[22] Filed: Oct. 18, 1982

[30] Foreign Application Priority Data

Oct. 21, 1981 [DE] Fed. Rep. of Germany ....... 3141770

[51] Int. Cl.³ .................... C01B 17/00; B01D 19/00
[52] U.S. Cl. ................................. 423/243; 423/242; 423/512 A; 423/545; 55/73
[58] Field of Search ............... 423/242 A, 242 R, 243, 423/244 A, 244 R, 512 A, 545; 55/73

[56] References Cited

U.S. PATENT DOCUMENTS 3,658,462  4/1972  Van Scoy ...................... 423/243
3,959,451  5/1976  Henderson et al. ............ 423/243
3,980,760  9/1976  Henderson et al. ............ 423/243

Primary Examiner—Gregory A. Heller
Attorney, Agent, or Firm—James Creighton Wray

[57] ABSTRACT

Method and apparatus for regenerating physically acting organic scrubbing agents laden with sulfur dioxide and/or sulfur trioxide and eventually carbon dioxide in the course of a gas purification process. Equipment costs and energy losses are reduced by adding ammonia and, if necessary, water, to the laden scrubbing fluids and then separating the resultant ammonia sulfite and/or ammonia sulfate. Large differences in temperature between the scrubbing steps and the regenerating steps are not needed. A beneficial energy balance results.

14 Claims, 1 Drawing Figure

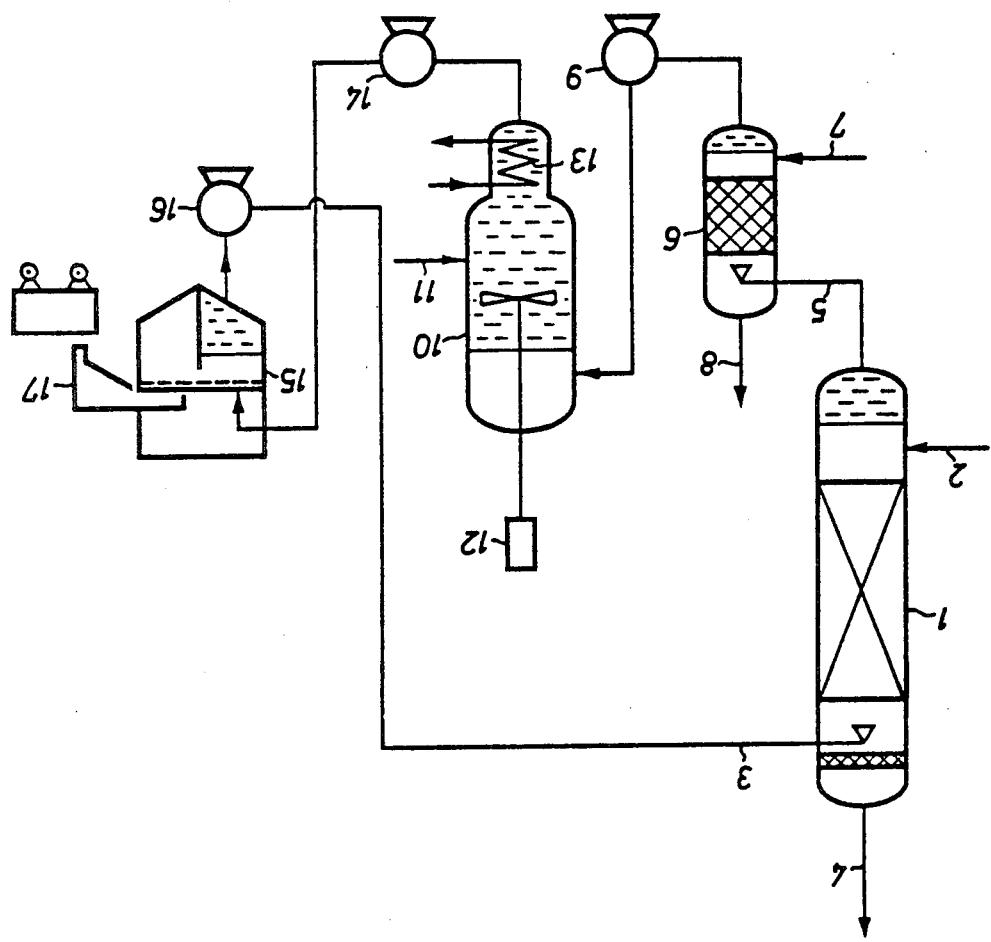

METHOD FOR REGENERATING PHYSICALLY ACTING ORGANIC SCRUBBING AGENTS

BACKGROUND OF THE INVENTION

This invention relates to a method and apparatus for regenerating physically acting organic scrubbing fluids which are laden with sulfur dioxide and/or sulfur trioxide and eventually carbon dioxide during the course of a gas purification procedure.

Exhaust gases produced by the burning of sulfurous fossil fuels contain considerable amounts of sulfur dioxide and sulfur trioxide, both of which are extremely harmful to the environment because of their ability to form sulfurous or sulfuric acid when combined with water. Hence, it is important to remove those components from the exhaust gases before releasing the gases into the atmosphere, especially in power plants where large amounts of exhaust gases are produced.

A known process for removing the components involves scrubbing the exhaust gas with aqueous solutions of alkaline or earth alkaline compounds. Recently, dimethylformamide a physically acting organic scrubbing agent which was previously used for other purposes in gas purification processes, has proved effective in removing the sulfur components. In contrast to the above-mentioned chemically acting scrubbing agents, dimethylformamide has the advantage of relatively easy regeneration because the components which have to be removed merely dissolve themselves therein whereas, in the chemically acting scrubbing agents, the components are bound through a chemical reaction.

Ease of regeneration is important, especially with compounds such as sulfur dioxide or sulfur trioxide, because it decisively influences the simplicity and operation of the exhaust gas scrubbing procedure.

In German patent application DE-OS No. 28 48 721, a process is described for the removal of undesired gaseous components from hot exhaust gases. Sulfur dioxide is absorbed from exhaust gases which occur during the oxidation of carbon-containing fuels by the use of dimethylformamide at temperatures below 0° C. The absorbed sulfur dioxide is removed from the scrubbing fluid at conditions of subatmospheric pressure and temperature of approximately 70° C. Hence, the sump of the regenerating column must be constantly heated. Additionally, this process requires constant attention to avoid hydrolyzing the laden dimethylformamide in the regenerating column. Hydrolysis can occur with high temperatures in the presence of an acid aqueous solution. Gases containing sulfur dioxide and/or sulfur trioxide generally carry along water vapor. Hence, it is possible that small amounts of sulfuric acid will be brought into the regenerating column. To make it possible to work below the range of temperatures at which hydrolysis occurs, the regeneration in the known process is conducted below atmospheric pressures. As a result, the amount of heat which must be supplied to the column sump is reduced. However, a constant supply of energy is needed to maintain the sub-atmospheric pressures.

The known process requires expensive apparatus and large amounts of energy in order to accomplish the regeneration of the laden scrubbing fluid.

SUMMARY OF THE INVENTION

It is an object of the present invention to provide a process for the regeneration of scrubbing fluids ladened with sulfur dioxide and/or sulfur trioxide and eventually carbon dioxide which is more economical than the existing process in that it requires reduced expenditures for equipment and energy.

The present invention solves that problem by feeding ammonia and, if necessary, water into the laden scrubbing fluid and by separating therefrom the resultant ammonia sulfite and/or ammonia sulfate.

An important advantage obtained by use of the present invention is that it is no longer necessary to constantly heat the regenerating column sump and constantly cool the regenerating column head. It is not necessary to maintain a large difference in temperature between the scrubbing process and the regenerating process.

The regenerating process uses the two reactions

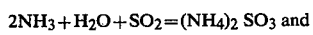

$2NH_3 + H_2O + SO_2 = (NH_4)_2 SO_3$ and

$2NH_3 + H_2O + SO_3 = (NH_4)_2 SO_4$

It can be seen that ammonia, which is a very inexpensive product, and water are the only compounds needed in the regeneration process. Water must be added with the ammonia only if there is not already enough water in the equivalent amounts in the crude gas or in the circulating scrubbing fluids.

With increased concentrations of ammonia sulfite or ammonia sulfate in the scrubbing fluid, the limit of solubility is exceeded at a point which is dependent upon temperature. At that point, the compounds begin to precipitate in solid form. Addition of ammonia is continued until almost all of the sulfur dioxide or sulfur trioxide which is dissolved in the scrubbing fluid is transposed.

The precipitate crystals are separated from the scrubbing fluid by use of any known process, such as filtering or centrifugal clarification.

It has proven advantageous to cool the scrubbing fluid to the lowest process temperature during the regeneration procedure, i.e., during the addition of ammonia or at some point thereafter, to prevent precipitation of the salts after filteration.

In a preferred embodiment of the invention, the ammonia is not added to the scrubbing fluid in gaseous form but is added in liquid form because its relatively high heat of vaporization (249kcal/Nm$^3$) cools the scrubbing fluid which has to be regenerated, thereby reducing the necessity for external heat removal.

It is desirable to transpose the SO$_2$ and SO$_3$ which are dissolved in the scrubbing fluid as completely as possible with ammonia without adding excess amounts of ammonia. Surplus ammonia will be ejected from the scrubbing agent during the gas purification procedure and will be released into the atmosphere, thereby resulting in economic loss and/or damage to the environment. To avoid that problem, the ammonia is added in only small amounts. Any remainder of SO$_2$ and SO$_3$ which stays in the scrubbing agent is not important so long as the desired effect of the scrubbing process is not impaired.

In certain cases, for example when the exhaust gases contain only small amounts of SO$_2$ and SO$_3$ or when the main component of sulfur has to be gained from the crude gas as SO$_2$ and when the gauge of SO$_3$ in the scrubbing agent has to be limited, it is desirable to separate only a part of the circulating scrubbing agent and to direct that part through the regeneration and precipitation with ammonia so that a low, small, tolerable $SO_2$-$SO_3$-gauge is constantly maintained with an extremely economical regeneration procedure. The process of regeneration according to the present invention can be used with the following physically acting organic scrubbing agents: Amides, especially dimethylformamide; alcohols, especially methyl alcohol; glycoles, especially ethylene glycole and substituted polyethylene glycoles; and esters, especially acetic acid ethyl ester.

The ammonia sulfite and ammonia sulfate which are formed in the regeneration process can be used in other applications. For example, the ammonia sulfate can be used as an agricultural fertilizer.

These and other and further objects and features of the invention are apparent in the disclosure which includes the above and below specification and claims and drawings.

BRIEF DESCRIPTION OF THE DRAWING

The FIGURE is a schematic diagram of apparatus used for carrying out the process of the present invention.

DETAILED DESCRIPTION OF THE DRAWING

Specific parameters and apparatus for carrying out the above described process will now be disclosed. However, it is understood that the invention is not limited to use of these specific parameters and devices.

600,000 $Nm^3$ of moist flue gas with the following constitution

|  | Mol % | $Nm^3/h$ |
| --- | --- | --- |
| $N_2 + Ar$ | 74.9 | 449,400 |
| $O_2$ | 4 | 24,000 |
| $CO_2$ | 14 | 84,000 |
| $SO_2$ | 0.1 | 600 |
| $H_2)$ | 7 | 42,000 |
|  |  | 600,000 |

$SO_3$-Content: 30 vppm is cooled to $-50°$ C. in a regenerator installation (not shown). The majority of the water vapor precipitates in the generator together with 4.5 $Nm^3/h$ $SO_2$ and approximately 15 $Nm^3/h$ $SO_3$.

558,000 $Nm^3/h$ substantially dry flue gas containing 595.5 $Nm^3/h$ $SO_2$ and approximately 3 $Nm^3/h$ $SO_3$ (mainly in the form of a sulfuric acid fog) enters the scrubbing column 1 through a duct 2. 98 t/h dimethylformamide (DMF) with a temperature of about $-50°$ C. enters the scrubbing column 1 through a duct 3 and flows towards the flue gas which rises in the column 1. The pressure in the column 1 is about 1.2 bar. The DMF scrubbing agent picks up $SO_2$ and some $CO_2$ as well as sulfuric acid fog and $SO_3$. The flue gas leaving the scrubbing column 1 through the duct 4 has a $SO_2$ content of about 70 vppm. The flue gas is removed by the regenerator installation (not shown).

With 556.5 $Nm^3/h$ equivalent to 24.8 kgmol/h $SO_2$, and approximately 10 kg/h sulfuric acid and 760 $Nm^3/h$ $CO_2$ in dissolved condition, the scrubbing agent leaves the scrubbing tower 1 through a duct 5 and enters a $CO_2$ stripper 6. 6500 $Nm^3/h$ air with a temperature of about $-50°$ C. is led through a duct 7 towards the scrubbing agent which trickles down in the stripper 6, thereby degasifying the dissolved $CO_2$. The released $CO_2$ leaves the stripper 6 together with the used strip gas along a duct 8.

A pump 9 brings the laden scrubbing agent into a reactor 10. A solution of ammonia and water containing 847 kg/h equivalent to 49.9 kgmol/h $NH_3$ and 447 kg/h equivalent to 24.8 kgmol/h $H_2O$ is dosed into the reactor 10 through a duct 11. A stirring mechanism 12 mixes the liquids in the reactor 10. 1.1 Mio kcal/h set free during the reaction are taken up from the scrubbing agent and removed by a refrigerating agent which vaporizes in a cooling coil 13.

The resulting suspension of 2882 kg/h ammonia sulfite and 13 kg/h ammonia sulfate in DMF is brought into a rotating filter 15 by a pump 14. A pump 16 draws the filtrate through the duct 3 into the scrubbing column 1 as regenerated scrubbing agent. The produced salt is removed from the filter 15 by a wiper 17.

While the invention has been described with reference to specific embodiments, the exact nature and scope of the invention is defined in the following claims.

We claim:

1. A process for regenerating dimethylformamide used to scrub flue gas containing sulfur-based contaminants comprising the steps of flowing dimethylformamide into a scrubbing column to induce contact with flue gas contained therein so that the dimethylformamide becomes laden with sulfur-based contaminants and carbon dioxide previously found in the flue gas, supplying the laden scrubbing fluid to a carbon dioxide stripper, the stripper degasifying dissolved carbon dioxide, supplying the laden fluid to a reactor, dousing the fluid in the reactor with ammonia and water, mixing the contents of the reactor with a stirring mechanism thereby forming ammonium sulfite and ammonium sulfate salts suspended in the mixture, filtering the mixture to remove the salts and providing the scrubber with the filtrate, the filtrate providing a regenerated scrubbing agent.

2. The process of claim 1 wherein the ammonia is added to the scrubbing fluid in a gaseous state.

3. The process of claim 1 wherein the ammonia is added to the scrubbing fluid in a liquid state.

4. The process of claim 1 wherein the ammonia is added to only a portion of the scrubbing fluid.

5. The process of claim 1 further comprising cooling the scrubbing fluid to precipitate the ammonium sulfate before filtering the precipitated ammonium sulfate.

6. The process of claim 1 further comprising the step of removing water from the flue gas prior to scrubbing by cooling the flue gas to $-50°$ C.

7. The process of claim 1 further comprising the step of cooling the dimethylformamide to $-50°$ C. prior to scrubbing.

8. The process of claim 1 wherein the sulfur-based contaminants consist of sulfur dioxide, sulfur trioxide and sulfuric acid.

9. The process of claim 1 further comprising the step of supplying air at a temperature of $-50°$ C. to the carbon dioxide stripper to further the goal of degasification.

10. A process of claim 1 wherein the sulfur based contaminants consist of sulfur dioxide and sulfur trioxide and further comprising adding only ammonia to the laden dimethylformamide.

11. The process of claim 10 wherein the ammonia is added to the scrubbing fluid in amounts small enough to maintain transposition of sulfur dioxide or sulfur trioxide, without allowing ammonia to escape into the atmosphere.

12. The process of claim 10 wherein only a part of the scrubbing fluid is regenerated so that a low level of sulfur dioxide and sulfur trioxide is constantly maintained thereby rendering the process more economical.

13. The process of claim 10 further comprising the step of adding water to the laden dimethylformamide.

14. The process of claim 10 further comprising cooling the dimethylformamide to precipitate the ammonium sulfate and ammonium sulfite before filtering the precipitated ammonium sulfite and ammonium sulfate.

* * * * *